Figure 3:
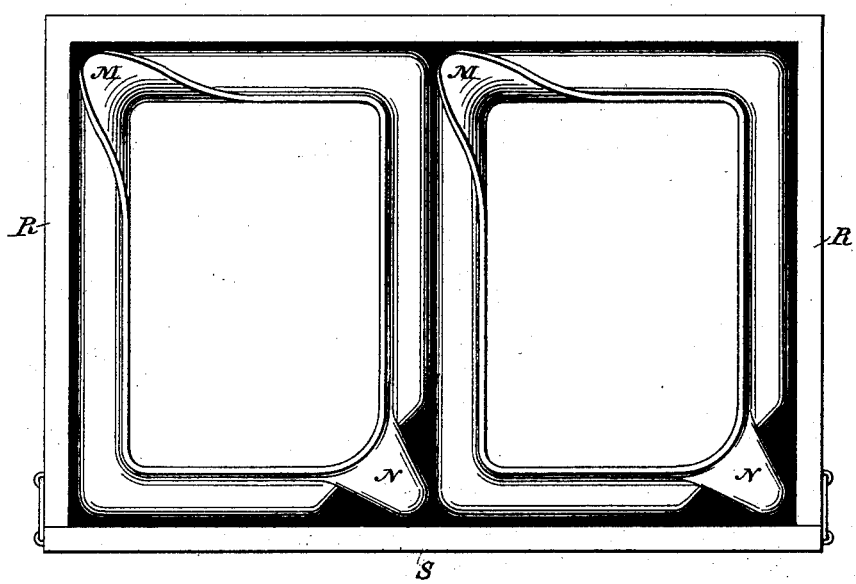

(No Model.) 2 Sheets—Sheet 1.
C. G. CURTIS & F. B. CROCKER.
ELECTRIC BATTERY JAR.
No. 358,019. Patented Feb. 22, 1887.
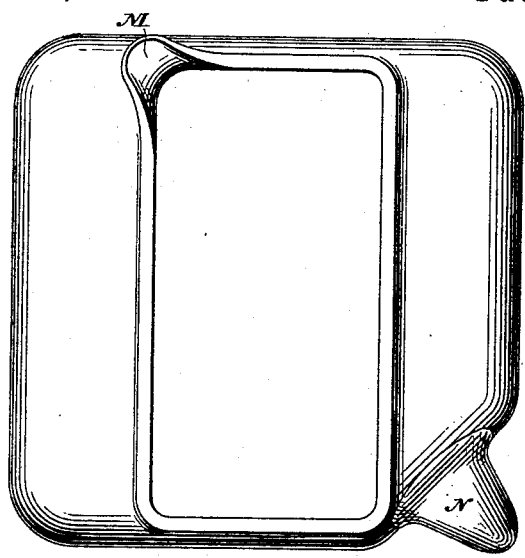
Fig. 1.
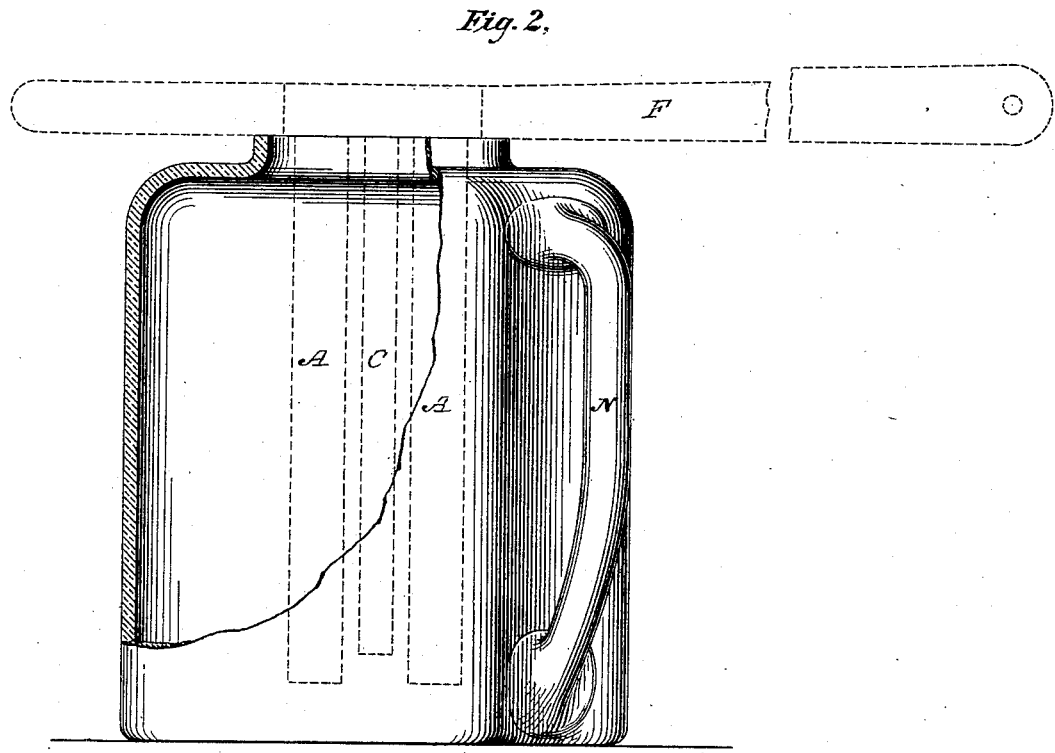
Witnesses
Geo. W. Breck
Chas. J. Maguire
Inventors
Charles G. Curtis
Francis B. Crocker (No Model.) 2 Sheets—Sheet 2.

C. G. CURTIS & F. B. CROCKER.
ELECTRIC BATTERY JAR.

No. 358,019. Patented Feb. 22, 1887.

Witnesses
Geo. W. Breck
Schuyler D. Wheeler

Inventors
Chas. G. Curtis
Francis B. Crocker

UNITED STATES PATENT OFFICE.

CHARLES G. CURTIS AND FRANCIS B. CROCKER, OF NEW YORK, N. Y., ASSIGNORS TO THE C. & C. ELECTRIC MOTOR COMPANY, OF NEW YORK.

ELECTRIC-BATTERY JAR.

SPECIFICATION forming part of Letters Patent No. 358,019, dated February 22, 1887.

Application filed March 29, 1886. Serial No. 196,934. (No model.)

*To all whom it may concern:*

Be it known that we, CHARLES G. CURTIS and FRANCIS B. CROCKER, both of the city, county, and State of New York, have invented a new and useful Improvement in Electric-Battery Jars, of which the following is a specification.

One of the great objections to electric batteries as heretofore made, which has prevented their use to any practical extent for domestic and other purposes, has been the trouble of taking care of them, and the fact that an unskillful person is almost certain to spill some of the acid solution contained in the jar in replacing the old with new or fresh solution. This objection becomes more and more important the more frequently the battery requires to be renewed, and in cases where the battery is employed to give a strong current and lasts only a comparatively short time without renewal, say from one to several days, like the battery we have described in an application filed by us the same date herewith, which may be used in such a way as to supply a very strong current for running sewing-machines and other light work and require frequent renewal, it is obviously necessary that the battery should be so constructed that the great difficulty of renewing the solution without spilling it should be overcome, in order to make such a battery of any practical use for domestic purposes. To accomplish this result we have devised a form of battery which is provided with a jar or liquid-holder from which the electrodes may readily be removed, and which is formed with a handle at the side, so that it may be readily grasped and carried by the hand, and also with a spout at the top, which enables the liquid to be poured out of the jar without spilling and without allowing it to trickle down the sides of the jar in emptying.

Our invention is represented in the accompanying drawings, Figure 1 being a top view of our battery, showing the electrodes removed, and Fig. 2 being a side view showing the electrodes in place in the jar and means for conveniently raising and lowering them. Fig. 3 is a top view showing two rectangular jars according to our invention contained in a rectangular box.

In cases where the battery is contained in square boxes or spaces it is often very desirable that the battery-jar which fits into the box should contain as much solution as possible, and under these circumstances the jar should be made in a square form, as we have shown in the drawings, though, of course, the jar may be made in the ordinary form, or any other desired form. We prefer to form the jar with a contracted neck or opening of only sufficient size to allow the electrodes or removable parts of the battery to pass, in order to prevent the solution from spilling over at the top by any accidental shaking or movement of the jar. The form we have shown is well adapted to such a battery as that described in our application hereinbefore referred to, and we have shown in dotted lines both the positive plate C and the negative plates A A as mounted upon the pivoted lever F, so that they may be conveniently raised out of and lowered into the solution like the battery described in that application.

On one side or at one corner of the opening or neck of the jar we form a lip or spout, M, which should preferably overhang slightly and extend beyond the edge or neck to which it is attached, so that the liquid can be poured out of the jar without the trickling down the neck and sides, and which, of course, may be formed at any part of the neck, and of any desired size and shape. Upon the side or cover of the jar, and preferably opposite the lip M, we form a handle, N, of the proper size and shape to be readily grasped by the hand. If the jar be a square one, then we form it with one of the corners rounded off or cut away, and we attach the handle at this corner, and are thus enabled to avoid having the handle project beyond the sides and to bring it within the circumscribed rectangular figure or box into which the jar is to fit.

Our jars may be made of any desired material and the handle attached in any desirable way; but under most circumstances it is probably preferable that they should be made of glass and the handle formed integral with them.

What we claim as our invention, and desire to secure by Letters Patent, is—

1. In an electric battery, the combination, with a rectangular containing box or case, of a rectangular jar or liquid-holder formed with a handle at one of the corners, so that the handle is practically within the circumscribed rectangle, whereby the jar fits in the box without loss of space and there is the minimum danger of the handle being broken off, substantially as described.

2. A rectangular battery-jar or liquid-holder a portion of which is removed or cut away, in which space the handle is placed, which handle is practically within the circumscribed rectangle, substantially as described.

3. A rectangular battery-jar or liquid-holder formed with a handle at one of the corners, so that the handle is practically within the circumscribed rectangle, substantially as described.

4. A rectangular battery-jar or liquid-holder formed with one of its corners rounded or cut away and a handle at that corner, so that the handle is practically within the circumscribed rectangle, substantially as described.

5. A rectangular jar or liquid-holder formed with a handle at one corner and a lip or spout at the diagonally-opposite corner, both of which are practically within the circumscribed rectangle, substantially as described.

CHARLES G. CURTIS.
FRANCIS B. CROCKER.

Witnesses:
GEO. BRUSH,
CHAS. J. MAGUIRE.